E. B. CUSHMAN.
SPLASH LUBRICATING SYSTEM.
APPLICATION FILED MAY 21, 1919.
1,347,685.
Patented July 27, 1920.
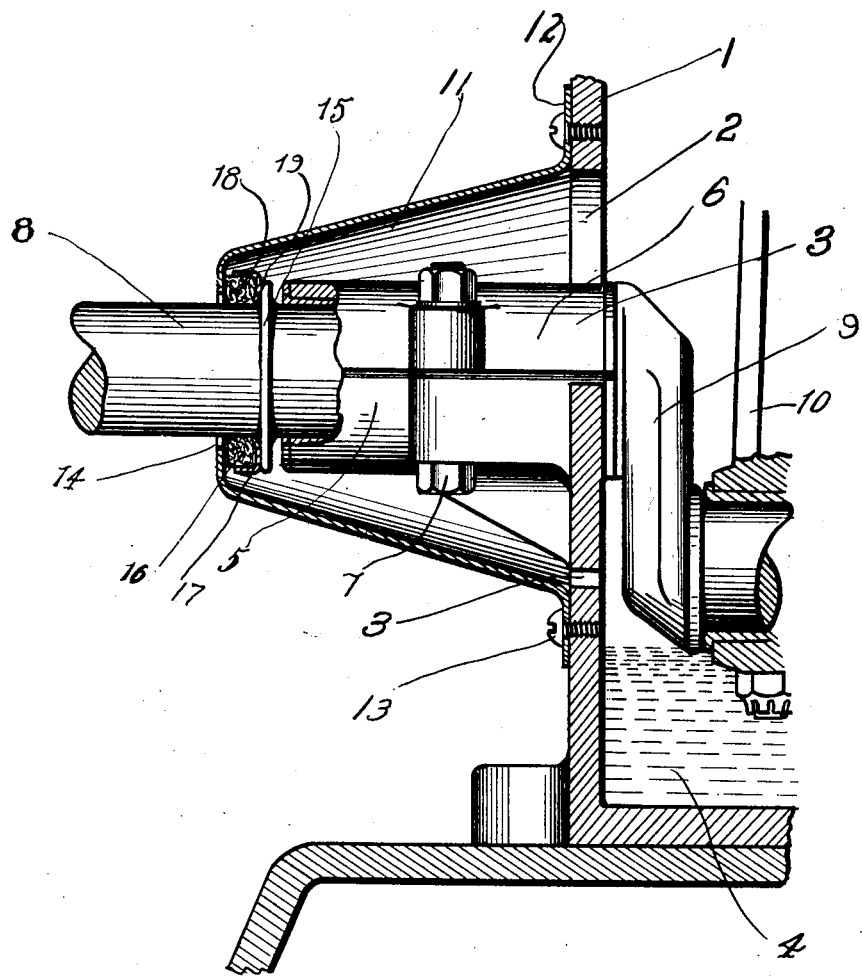
Inventor
Everett B. Cushman.
By Arthur C. Brown
Attorney

UNITED STATES PATENT OFFICE.

EVERETT B. CUSHMAN, OF TOPEKA, KANSAS.

SPLASH LUBRICATING SYSTEM.

1,347,685.　　　　Specification of Letters Patent.　　Patented July 27, 1920.

Application filed May 21, 1919. Serial No. 298,634.

*To all whom it may concern:*

Be it known that I, EVERETT B. CUSHMAN, a citizen of the United States, residing at Topeka, in the county of Shawnee and State of Kansas, have invented certain new and useful Improvements in Splash Lubricating Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to crank cases and has for its principal object to effect splash lubrication of a crank shaft without waste of the lubricant.

In accomplishing this object, I have provided improved details of structure, the preferred forms of which are illustrated in the accompanying drawing, wherein The single figure is a fragmentary view of a crank case embodying my invention.

Referring to the drawing by reference numerals.

1 designates a side wall of a crank case, of ordinary construction except for the improvements hereinafter noted, having a bearing opening 2 and a drain opening 3 below the bearing opening but above the normal level of the lubricant 4 that is contained within the case. Cast integral with the wall 1 and extending outwardly therefrom is a lower shaft bearing member 5 to which the cap bearing member 6 is attached by bolts 7, one of which is shown.

Revoluble in the bearings 5 and 6 is a shaft 8, having a crank portion 9 within the case carrying the piston rod 10, the oil level in the case being preferably so related to the crank that only the end of the piston rod will pass into the lubricant when the engine is in operation. This has been found to provide the most efficient splash for lubricating the shaft.

Projecting from the outer face of the wall 1 is a housing 11, preferably of sheet metal and frusto-conical shape, which incloses the bearing 5—6 and is of such diameter at its base as to closely include the bearing opening 2 and drain opening 3, the base having an out-turned flange 12 whereby it may be attached to the wall of the crank case by screws 13. The outer end of the housing terminates slightly beyond the end of the bearing and is closed except for the opening 14, which is only of sufficient diameter to permit free movement of the shaft.

Fixed in the shaft 8, within the housing and adjacent the outer end thereof, is a collar 15 and surrounding the shaft, between the collar and the end of the housing is a packing ring 16 for preventing escape of lubricant through the housing opening 14. To properly confine the packing and prevent excessive saturation thereof I preferably employ a retainer 17 comprising a ring cup 18, the base 19 of which may be welded or otherwise secured to the shaft collar 15 and the periphery of which incloses a part of the packing ring to retain the packing circumferentially while exposing a part of it to lubricant that is splashed into the housing.

With the parts assembled as described, when the engine is in operation, the end of the piston splashes lubricant from the bottom of the case through the opening 2 against the inclined wall of the housing, from which it is deflected onto the exposed portion of the shaft and packing ring, any surplus lubricant that is not taken up by the packing and bearing, flowing down the inclined bottom of the housing to the drain opening 3 through which it flows back into the crank case. The retainer cup holds the packing ring to the shaft to prevent its disintegration and insures against over-saturation and resultant leakage. Location of the drain opening above the normal level of lubricant in the case insures drain of surplus lubricant back to the main supply, thus maintaining the housing and bearings free from flooding.

What I claim and desire to secure by Letters-Patent is:

1. In combination, a crank case having a lubricating liquid therein and having a drain opening above the level of the liquid and a crank shaft opening above the drain opening, a crank shaft projecting through the second mentioned opening in the crank case, and a housing surrounding the two openings and having an opening through which the crank shaft projects, the floor of the housing being inclined in the direction of the drain opening.

2. In combination, a crank case having a crank shaft opening and a drain opening below it, a lubricating liquid in the crank case, the level of which is below the drain opening, an outstanding housing comprising a frusto-conical member surrounding both openings, means for fastening the housing to the crank case, a crank shaft projecting through the crank case and through an opening in the free end of the housing, and a packing member on the crank shaft adjacent to the free end of the housing.

3. In combination, a crank case having a shaft opening and a drain opening below the shaft opening, a frusto-conical housing detachably secured to the crank case, surrounding both openings at its base and closed at its free end except for a shaft opening, a crank shaft projecting through the crank case opening and through said opening in the housing, a collar on the shaft within the housing, and a packing ring on the shaft between the collar and the end of the housing.

4. In combination, a crank case having a crank shaft opening, an outstanding housing surrounding the opening and connected to the crank case, a crank shaft projecting through the crank case and through an opening in the free end of the housing, a collar rigid on the crank shaft, a retainer surrounding the shaft at the outer side of the collar, and a packing ring between the collar and the opening in the free end of the housing.

5. In combination, a crank case having a shaft opening and a drain opening below the shaft opening, a frusto-conical housing detachably secured to the crank case, surrounding both openings at its base and closed at its free end except for a shaft opening, a crank shaft projecting through the crank case opening and through said opening in the housing, a collar on the shaft within the housing, a packing ring on the shaft between the collar and the end of the housing, and a retainer cup held by the collar and partially surrounding the packing ring.

6. In combination, a crank case having a shaft opening and a drain opening below the shaft opening, a frusto-conical housing detachably secured to the crank case, surrounding both openings at its base and closed at its free end except for a shaft opening, a crank shaft projecting through the crank case opening and through said opening in the housing, a collar on the shaft within the housing, a packing ring on the shaft between the collar and the end of the housing, and a retainer cup fixed to the collar and partially surrounding the packing ring.

In testimony whereof I affix my signature.

EVERETT B. CUSHMAN.